(12) United States Patent
Miyawaki

(10) Patent No.: US 8,052,535 B2
(45) Date of Patent: Nov. 8, 2011

(54) MOTOR VEHICLE STEERING SHAFT AND MOTOR VEHICLE STEERING SYSTEM

(75) Inventor: Naoto Miyawaki, Kashiwara (JP)

(73) Assignee: JTEKT Corporation, Osaka (JP)

( * ) Notice: Subject to any disclaimer, the term of this patent is extended or adjusted under 35 U.S.C. 154(b) by 220 days.

(21) Appl. No.: 12/312,296

(22) PCT Filed: Nov. 5, 2007

(86) PCT No.: PCT/JP2007/071506
§ 371 (c)(1),
(2), (4) Date: May 5, 2009

(87) PCT Pub. No.: WO2008/056636
PCT Pub. Date: May 15, 2008

(65) Prior Publication Data
US 2009/0270185 A1    Oct. 29, 2009

(30) Foreign Application Priority Data
Nov. 10, 2006 (JP) .................. 2006-305529

(51) Int. Cl.
*F16D 3/64* (2006.01)
(52) U.S. Cl. .................. 464/83; 403/359.6; 384/42
(58) Field of Classification Search .................. 464/83, 464/162, 74, 76; 403/359.1, 359.6, 298, 403/356; 384/26, 29, 42
See application file for complete search history.

(56) References Cited

U.S. PATENT DOCUMENTS

| | | | | |
|---|---|---|---|---|
| 2,446,942 A * | 8/1948 | Mcfarland | ............ | 464/74 |
| 3,066,503 A * | 12/1962 | Fleming et al. | ............ | 464/74 |
| 3,757,601 A | 9/1973 | Burke | | |
| 3,805,552 A * | 4/1974 | Heald | ............ | 464/162 |
| 5,226,853 A * | 7/1993 | Courgeon | ............ | 464/160 |
| 5,460,574 A * | 10/1995 | Hobaugh | ............ | 464/162 |
| 5,481,937 A * | 1/1996 | Uphaus et al. | ............ | 74/493 |
| 5,709,605 A * | 1/1998 | Riefe et al. | ............ | 464/83 |
| 6,149,526 A * | 11/2000 | Boersma et al. | ............ | 464/89 |
| 6,283,867 B1 * | 9/2001 | Aota et al. | ............ | 464/74 |
| 6,343,993 B1 | 2/2002 | Duval et al. | | |
| 6,557,433 B1 * | 5/2003 | Castellon | ............ | 74/492 |
| 6,620,050 B2 * | 9/2003 | Park | ............ | 464/162 |

(Continued)

FOREIGN PATENT DOCUMENTS

EP    1 065 397 A1    1/2001

(Continued)

*Primary Examiner* — Gregory Binda
*Assistant Examiner* — Matthieu Setliff
(74) *Attorney, Agent, or Firm* — Rabin & Berdo, PC

(57) ABSTRACT

A motor vehicle steering shaft (3) is provided with: an inner shaft (11) and a tubular outer shaft (10) fitted into each other and to transmit a torque to and from each other; a rigid coupling element (25) for rigidly coupling the inner shaft (11) and the outer shaft (10) in a circumferential direction (C) of the inner shaft (11) when a relative rotation amount of the inner shaft (11) and the outer shaft (10) exceeds a predetermined range; and an elastic coupling element (36) for elastically coupling the inner shaft (11) and the outer shaft (10) in the circumferential direction (C) of the inner shaft (11) when the relative rotation amount of the inner shaft (11) and the outer shaft (10) is within the predetermined range. The elastic coupling element (36) includes a resin member (36). The inner shaft (11) and the outer shaft (10) are elastically supported mutually via the resin member (36) at a central position of the predetermined range when no torque is loaded to the steering shaft (3).

9 Claims, 8 Drawing Sheets

U.S. PATENT DOCUMENTS

| | | |
|---|---|---|
| 7,416,199 B2 * | 8/2008 | Yamada .................. 280/93.502 |
| 7,526,978 B2 | 5/2009 | Bahr et al. |
| 7,559,266 B2 * | 7/2009 | Kurokawa ...................... 74/492 |
| 2004/0245759 A1 | 12/2004 | Yamada et al. |
| 2006/0053934 A1 | 3/2006 | Bahr et al. |
| 2006/0082120 A1 | 4/2006 | Taniguchi et al. |

FOREIGN PATENT DOCUMENTS

| | | |
|---|---|---|
| EP | 1 635 081 A1 | 3/2006 |
| JP | 55-122534 | 8/1980 |
| JP | 2003-063414 | 3/2003 |
| JP | 2004-196261 | 7/2004 |
| JP | 2005-231625 | 9/2005 |
| JP | 2005-324599 | 11/2005 |
| JP | 2005-344747 | 12/2005 |
| JP | 2006-090480 | 4/2006 |
| JP | 2007-147059 | 6/2007 |
| WO | WO-03/031250 | 4/2003 |

* cited by examiner

MOTOR VEHICLE STEERING SHAFT AND MOTOR VEHICLE STEERING SYSTEM

TECHNICAL FIELD

The present invention relates to a motor vehicle steering shaft and a motor vehicle steering system.

BACKGROUND ART

Examples of a motor vehicle steering shaft include a steering shaft coupled to a steering member (e.g., see Patent Document 1) and an intermediate shaft for coupling a steering shaft and a steering mechanism (e.g., see Patent Documents 2 to 5).
Patent Document 1: U.S. Pat. No. 3,757,601
Patent Document 2: U.S. Pat. No. 6,620,050
Patent Document 3: WO 2003/031250
Patent Document 4: Japanese Published Unexamined Patent Application No. 2003-63414
Patent Document 5: Japanese Published Unexamined Patent Application No. 2004-196261

DISCLOSURE OF THE INVENTION

Problem to be Solved by the Invention

These motor vehicle steering shafts include a male shaft and a female shaft fitted into each other. Such a steering shaft includes that in which a male shaft and a female shaft are fixed to each other via a resin pin as shown in Patent Document 1, or that in which the male shaft and the female shaft are fitted in a manner to enable relative sliding so that a telescopic adjustment is enabled.

Out of these, in the telescopically adjustable steering shaft, the male shaft and the female shaft are serration-connected, for example. However, in the case of the serration-connection, a gap is generated between the teeth of the male shaft and those of the female shaft, and as a result, near a steering neutral position where the rotation angle of the steering member is zero, there occurs no counter force torque that is equal to an input torque corresponding to the steering angle applied by a driver when the steering member is steered. This necessitates the driver to steer the steering member as if in a state of a large counter force torque, and thus, the driver tends to be in a state of steering the steering member more than required.

Further, when the steering angle exceeds a predetermined range, the teeth of the male shaft and those of the female shaft are meshed together, and as a result, the counter force torque abruptly becomes large. Thus, when the driver attempts to steer the steering member in a predetermined steering angle the way it is before the counter force torque is increased, it is difficult to achieve the necessary steering angle because the steering torque of the driver is insufficient. As a result, a drifting feeling is sensed during steering, and thus, the steering stability is lost. This may easily force the driver to perform unnecessary fine adjustment for the steering operation.

When the gap between the teeth of the male shaft and those of the female shaft is narrowed as means of solving this problem, a sliding friction between the male shaft and the female shaft becomes large in the conventional technology, and in the case of a metal contact in particular, this friction results in a significant sliding resistance for the driver. Therefore, at the time of the telescopic adjustment, it is difficult to smoothly change the position of the steering member.

A conceivable method of solving this problem is to form a resin film by applying a nylon coating to the teeth of the male shaft or those of the female shaft, thereby reducing the sliding resistance while narrowing the gap. However, the resin film is very thin. Thus, forming the resin film to a desired thickness is difficult at the time of manufacturing, or at the time of drying the nylon resin coated on the teeth of the male shaft or the female shaft, the yield is low, and the manufacturing cost is high.

The present invention has been achieved based on such a background, and it is an object thereof to provide a motor vehicle steering system configured so that a driver does not experience an unnecessary torque fluctuation between a male shaft and a female shaft, which is inherent in the above-described problem, only information required by the driver such as a road surface condition and motor vehicle behavior can be conveyed, a sliding resistance can be reduced, and a cost is inexpensive.

Means for Solving the Problem

To achieve the above-described object, a preferred mode of the present invention is a motor vehicle steering shaft rotating responsive of steering of a steering member, the motor vehicle steering shaft being provided with: an inner shaft and a tubular outer shaft fitted in a manner to relatively slide in a shaft direction and to transmit a torque to and from each other; a rigid coupling element for rigidly coupling the inner shaft and the outer shaft in a circumferential direction of the inner shaft when a relative rotation amount of the inner shaft and the outer shaft exceeds a predetermined range; and an elastic coupling element for elastically coupling the inner shaft and the outer shaft in the circumferential direction of the inner shaft when the relative rotation amount of the inner shaft and the outer shaft is within the predetermined range. The elastic coupling element includes a resin member that extends across a shaft-direction groove formed on an outer circumferential surface of the inner shaft and a shaft-direction groove formed on an inner circumferential surface of the outer shaft. The inner shaft and the outer shaft are elastically supported mutually via the resin member at a central position of the predetermined range when no torque is loaded to the steering shaft.

According to the present mode, even when a relative rotation amount of the inner shaft and the outer shaft is within a predetermined range, the inner shaft and the outer shaft are coupled by the resin member in the circumferential direction. Thereby, when the steering member is steered, a counter force torque that is equal to an input torque according to a steering angle can be generated, steering deficiency or steering excess can be prevented, and driver's steering drift can be prevented. Further, before the relative rotation amount of the inner shaft and the outer shaft exceeds a predetermined range, a certain amount of steering counter force has been generated. Thus, it is possible to prevent a steep change in transmission torque before and after the relative rotation amount exceeds a predetermined range, and the counter force torque equal to the input torque can be smoothly raised. Therefore, rather than applying an unnecessary torque fluctuation to the driver, only the information required by the driver, such as a road surface condition and a motor vehicle behavior, can be conveyed. For example, a steering drift near the steering neutral position where the steering angle is zero is eliminated, and a sense of stability of the steering system obtained from the steering member can be improved. Also, by floating the inner shaft and the outer shaft to each other by the resin member, contacting of rigid coupling elements is avoided. Thereby, a sliding resistance between both shafts is significantly lessened. As a result, at the time of a telescopic adjustment, etc., the inner shaft and the outer shaft can be smoothly slid relative to each other with a small amount of force. Further, forming the resin

BEST MODE FOR CARRYING OUT THE INVENTION

Preferred embodiments of the present invention will be described with reference to the accompanying drawings.

Figure 1:
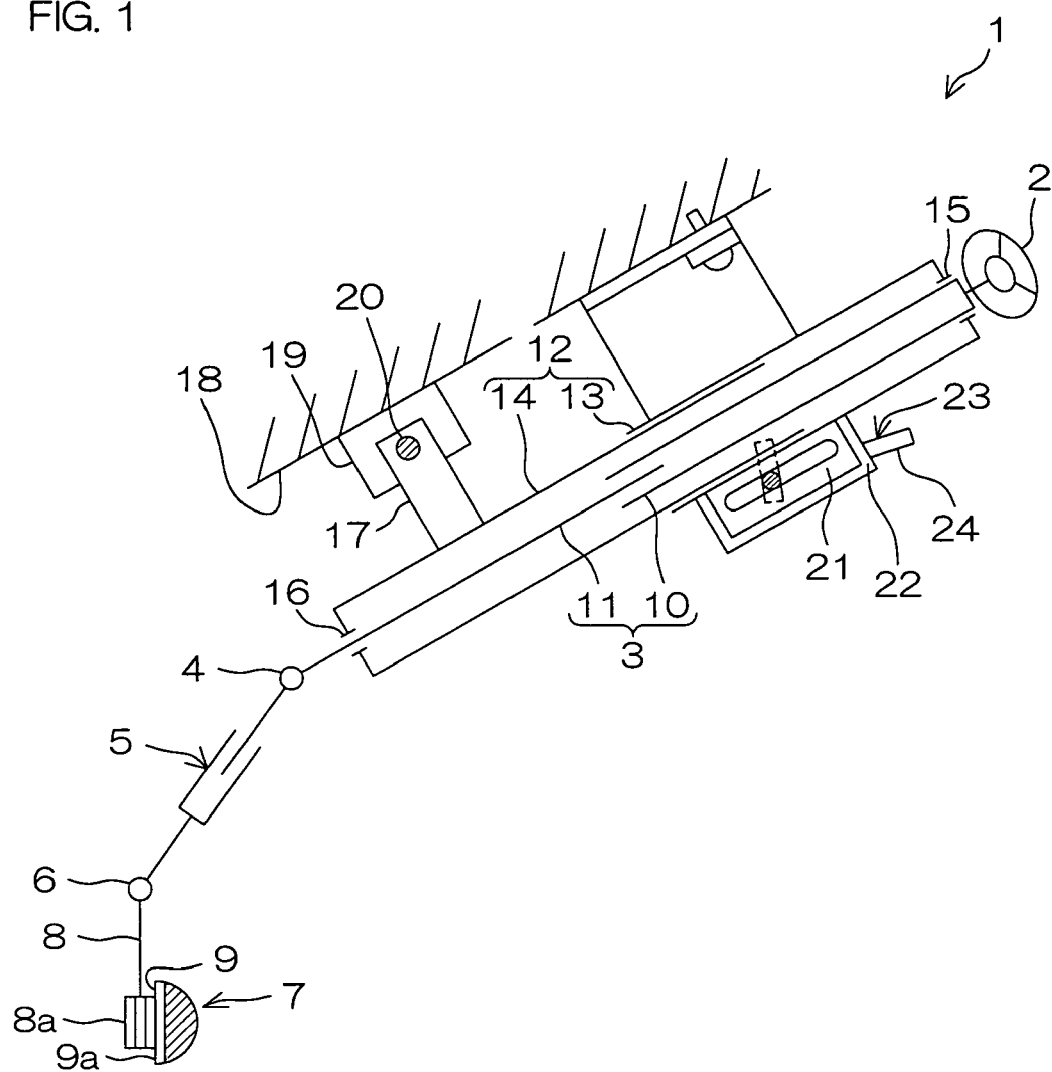
FIG. 1 is a diagram showing a schematic configuration of a motor vehicle steering system provided with a motor vehicle steering shaft according to one embodiment of the present invention.

FIG. 1 is a diagram showing a schematic configuration of a motor vehicle steering system 1 provided with a motor vehicle steering shaft according to one embodiment of the present invention. With reference to FIG. 1, the motor vehicle steering system 1 is provided with both of a tilt adjusting function for adjusting the position of a steering member 2 such as a steering wheel, vertically for a driver, and a telescopic adjusting function for adjusting the position of the steering member 2, forwardly and backwardly for the driver.

The motor vehicle steering system 1 is provided with the steering member 2, and a steering shaft 3 for a motor vehicle that is coupled to the steering member 2 and rotates according to steering of the steering member 2.

The steering member 2 is attached to one end of the steering shaft 3. The steering shaft 3 is placed in an inclined manner so that the one end attached with the steering member 2 is an upper side. The other end of the steering shaft 3 is coupled via a universal joint 4, an intermediate shaft 5, and a universal joint 6, to a steered mechanism 7. The steered mechanism 7 is provided with a pinion shaft 8 continued to the universal joint 6 and a rack shaft 9 having rack teeth 9a meshed with a pinion 8a at one end of the pinion shaft 8.

When the steering member 2 is rotation-operated to rotate the steering shaft 3, a steering torque of the steering member 2 is conveyed to the steered mechanism 7. The pinion 8a of the steered mechanism 7 is rotated, and this rotation motion is converted to a linear motion in a lengthwise direction of the rack shaft 9. As a result, a knuckle arm is turned via a tie rod (not shown) coupled to the rack shaft 9, thereby steering the steered wheel.

The steering shaft 3 includes: a tubular outer shaft 10 of which the one end is attached with the steering member 2; and a rod-shaped inner shaft 11. One end of the inner shaft 11 and the other end of the outer shaft 10 are fitted in a manner to convey a torque therebetween and to enable relative sliding in a shaft direction. The other end of the inner shaft 11 is coupled to the universal joint 4.

The steering shaft 3 is rotatably supported in a column tube 12. The column tube 12 includes: an outer tube 13 surrounding the outer shaft 10; and an inner tube 14. The inner tube 14 is fitted to the outer tube 13 in a manner to enable relative sliding in a shaft direction, and surrounds the inner shaft 11. The outer tube 13 supports the outer shaft 10 via a bearing 15 in a manner to rotate freely and to move together with the outer shaft 10 in a shaft direction. The inner tube 14 supports the inner shaft 11 via a bearing 16 in a manner to rotate freely and to disable movement in a shaft direction.

To the inner tube 14, a first bracket 17 is fixed. The inner tube 14 is supported via a spindle 20 to a second bracket 19 fixed on a vehicle body 18. The inner tube 14 can swing around the spindle 20.

To the outer tube 13, a third bracket 21 is fixed. The outer tube 13 faces a fourth bracket 22 fixed on the vehicle body 18. The third bracket 21 is locked to the fourth bracket 22 by a lock mechanism 23.

When an operation lever 24 of the lock mechanism 23 is operated to cancel the locking, a telescopic operation is enabled in which the outer tube 13 and the outer shaft 10 are moved in a shaft direction relative to the corresponding inner tube 14 and inner shaft 11. Further, when the locking is canceled, a tilt operation is enabled in which the outer shaft 10, the inner shaft 11, the outer tube 13, and the inner tube 14 are swung around the spindle 20.

Figure 2:
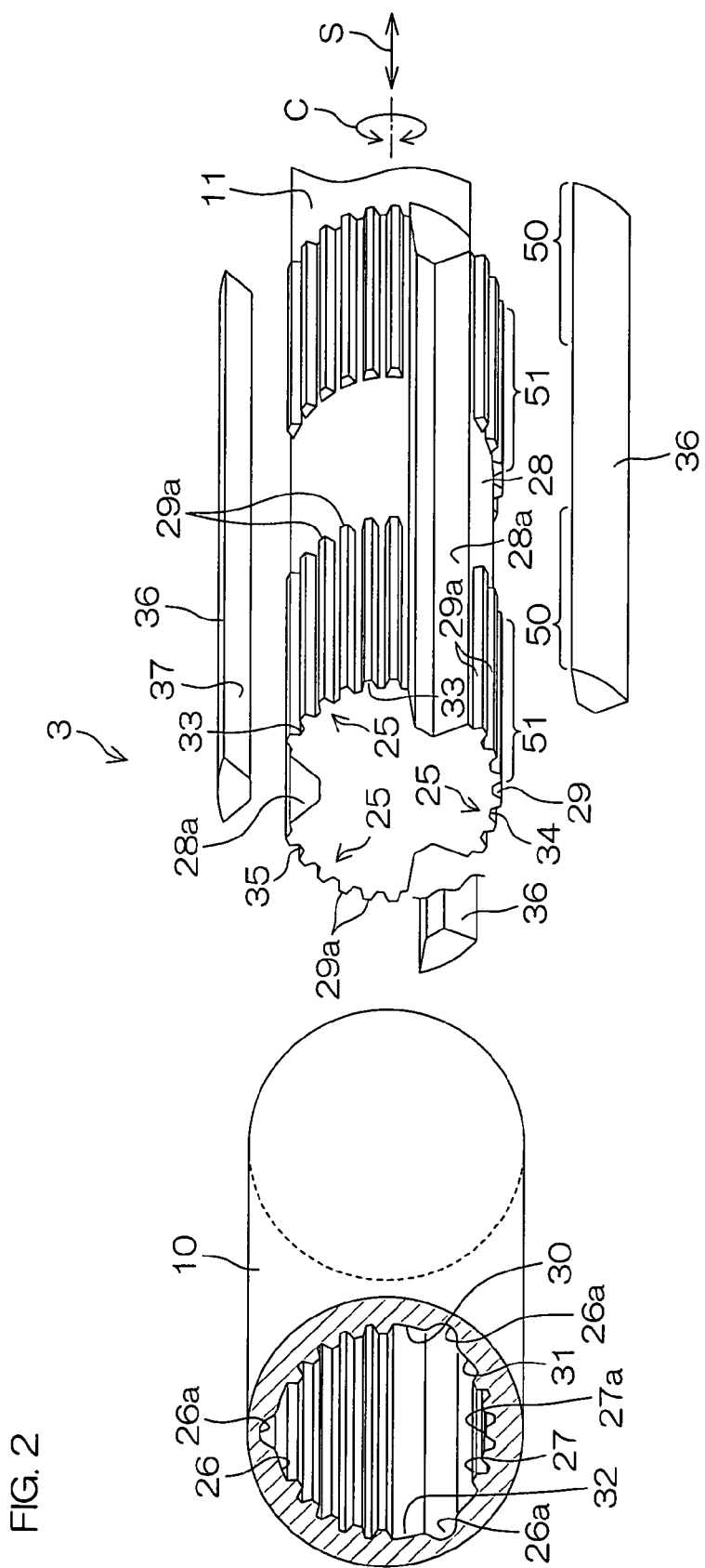
FIG. 2 is an exploded perspective view of a main part of a steering shaft.
Figure 3:
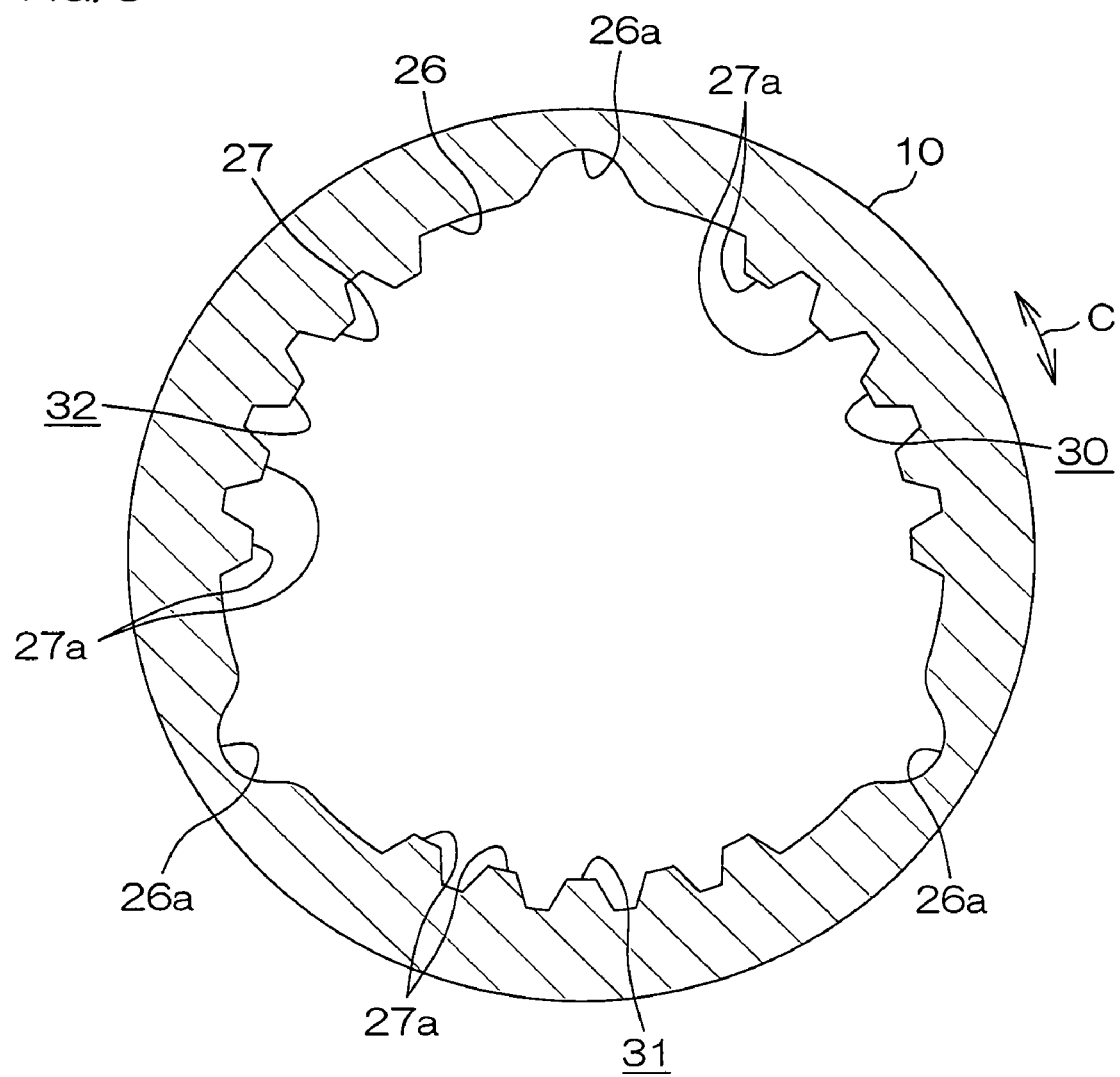
FIG. 3 is a cross-sectional view of the other end of an outer shaft.
Figure 4:
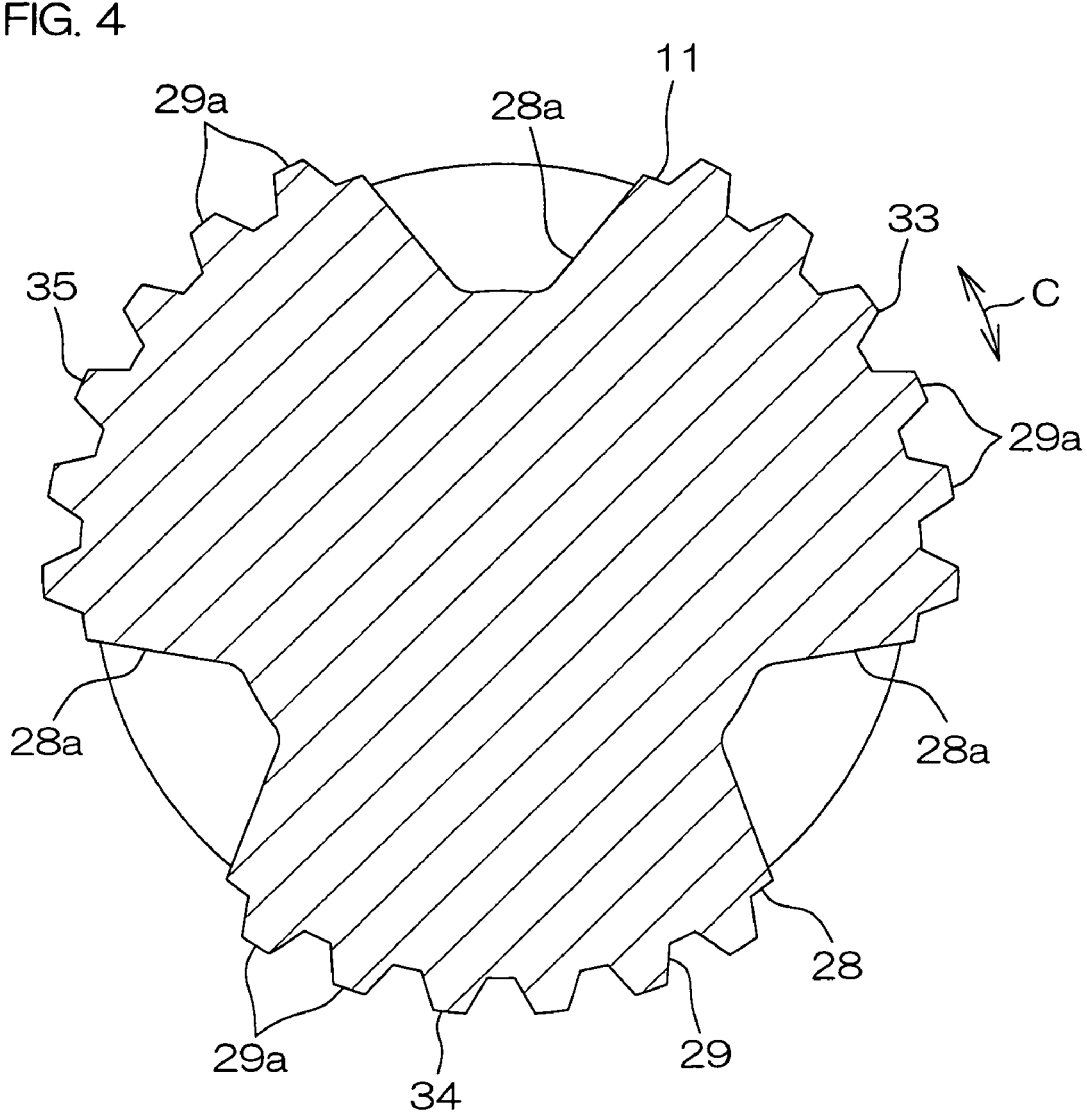
FIG. 4 is a cross-sectional view of one end of an inner shaft.

FIG. 2 is an exploded perspective view of a main part of the steering shaft 3. FIG. 3 is a cross-sectional view of the other end of the outer shaft 10. FIG. 4 is a cross-sectional view of one end of the inner shaft 11. With reference to FIG. 2, on an inner circumferential surface 26 of the outer shaft 10, shaft-direction grooves 26a extending in a shaft direction S of the steering shaft 3 are arranged. A plurality (in the present embodiment, three, for example) of shaft-direction grooves 26a at equal intervals in a circumferential direction C are arranged.

The inner circumferential surface 26 is sectioned in first, second, and third regions 30, 31, and 32 by the shaft-direction grooves 26a.

On an outer circumferential surface 28 of the inner shaft 11, shaft-direction grooves 28a extending in the shaft direction S are arranged. A plurality (in the present embodiment, three, for example) of shaft-direction grooves 28a at equal intervals in the circumferential direction C are arranged. The shaft-direction grooves 28a and the corresponding shaft-direction grooves 26a of the outer shaft 10 are faced to each other in a radial direction.

The outer circumferential surface 28 is sectioned in first, second, and third regions 33, 34, and 35 by the shaft-direction grooves 28a.

In the outer shaft 10 and the inner shaft 11 of the steering shaft 3, a plurality of serrations 25 as rigid coupling elements are arranged. Each serration 25 rigidly couples the inner shaft 11 and the outer shaft 10 in the circumferential direction C of the steering shaft 3 when a relative rotation amount (a relative position in the circumferential direction C of the steering shaft 3) of both shafts 10 and 11 exceed a predetermined range.

The serrations 25 are formed in the first region 30 of the outer shaft 10 and in the first region 33 of the inner shaft 11. Further, the serrations 25 are formed in the second region 31 of the outer shaft 10 and the second region 34 of the inner shaft 11. Moreover, the serrations 25 are formed in the third region 32 of the outer shaft 10 and the third region 35 of the inner shaft 11. The serrations 25 are placed at equal intervals in the circumferential direction C.

Each serration 25 includes male serration portions 29 as outer teeth and female serration portions 27 as inner teeth, which are fitted into one another. Each female serration portion 27 is arranged on the inner circumferential surface 26 of the outer shaft 10. Each male serration portion 29 is arranged on the outer circumferential surface 28 of the inner shaft 11.

With reference to FIG. 2 and FIG. 3, the female serration portions 27 are formed in a portion where the shaft-direction grooves 26a are not formed on the inner circumferential surface 26 of the outer shaft 10. Each female serration portion 27 has a predetermined length in the shaft direction S. In each of the first to third regions 30, 31, and 32 on the inner circumferential surface 26, a plurality (in the present embodiment, five, for example) of inner teeth 27a of each female serration portion 27 are arranged. The adjacent inner teeth 27a are placed at a constant pitch.

With reference to FIG. 2 and FIG. 4, in each of the first to third regions 33, 34, and 35 on the outer circumferential surface 28, a plurality (in the present embodiment, six, for example) of outer teeth 29a of the male serration portion 29 in the circumferential direction C are arranged. The outer teeth 29a adjacent in the circumferential direction C are placed at a constant pitch. Each of the outer teeth 29a and the corresponding inner teeth 27a can be meshed in a state of being serration-connected to each other.

Figure 5:
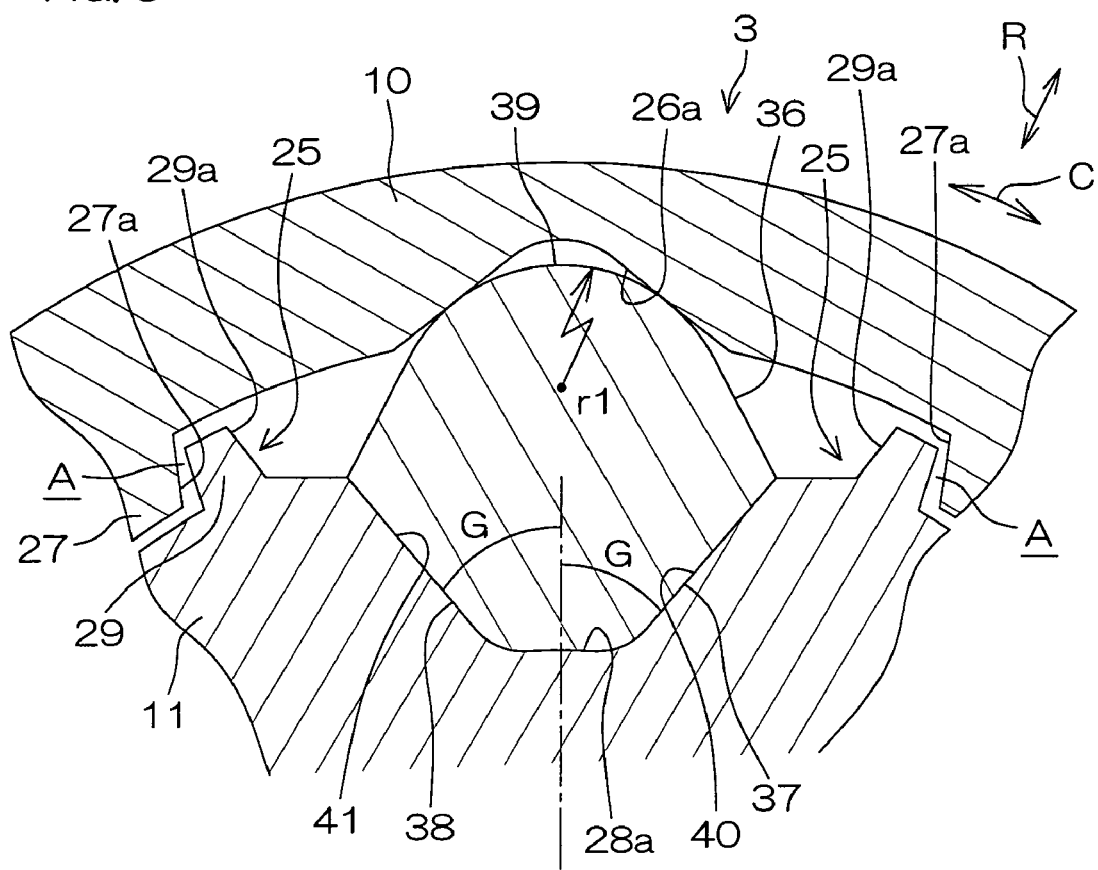
FIG. 5 is a cross-sectional view of a main part of a steering shaft.

FIG. 5 is a cross-sectional view of a main part of the steering shaft 3. With reference to FIG. 2 and FIG. 5, a state where the steering angle θ of the steering member is zero is called a steering neutral state. In the steering neutral state, between each of the inner teeth 27a of the female serration portion 27 and the corresponding outer teeth 29a of the male serration portion 29, predetermined gaps A in the circumferential direction C are respectively arranged.

As a result, while the steering angle θ of the steering member is from zero to equal to or less than a predetermined steering angle |θ1| (for example, about several minutes), each of the inner teeth 27a of the female serration portion 27 and the corresponding outer teeth 29a of the male serration portion 29 are kept apart so that both teeth are not meshed with each other. In addition, the steering angle θ is positive in one direction in the circumferential direction C and is negative in the other direction in the same.

When the steering angle θ is equal to or less than a predetermined steering angle |θ1|, a relative rotation amount of the inner shaft 11 and the outer shaft 10 is within a predetermined range, and the gaps A between the serrations of the inner shaft 11 and the outer shaft 10 are within a predetermined range (for example, about several minutes in terms of the steering angle). On the other hand, when the steering angle θ exceeds a predetermined steering angle |θ1|, the relative rotation amount of the inner shaft 11 and the outer shaft 10 exceeds a predetermined range, and the gaps A between the serrations of the inner shaft 11 and the outer shaft 10 are zero.

When the steering angle θ exceeds a predetermined steering angle |θ1|, each of the inner teeth 27a of the female serration portion 27 and the corresponding outer teeth 29a of the male serration portion 29 are meshed with each other. Thereby, it becomes possible to transmit the torque in the state where the inner shaft 11 and the outer shaft 10 are rigidly coupled in the circumferential direction C.

Between the inner shaft 11 and the outer shaft 10, a resin member 36 as an elastic coupling element is interposed. The resin member 36 is for elastically coupling the inner shaft 11 and the outer shaft 10 in the circumferential direction C when the relative rotation amount of both shafts 10 and 11 are within the above-described predetermined range. When torque is not loaded to the steering shaft 3, the inner shaft 11 and the outer shaft 10 are elastically supported mutually via the resin member 36 at the steering angle θ=0 degrees which is equivalent to the central position of the above-described predetermined range.

A plurality of resin members 36 (in the present embodiment, three) to be spaced apart at equal intervals in the circumferential direction C of the inner shaft 11 are placed. Each resin member 36 is in a rod shape and extends across the corresponding shaft-direction groove 28a of the inner shaft 11 and the corresponding shaft-direction groove 26a of the outer shaft 10.

In the shaft direction S, each resin member 36 extends over the approximately entire region of the corresponding shaft-direction grooves 26a and 28a. Each resin member 36 includes a portion 50 of which the position in the shaft direction S is superimposed with that of the serration 25 to each other. The portions 50 are placed in one portion on one end side of each resin member 36 and in one portion on the other end side thereof in the shaft direction S. Each serration 25 includes a portion 51 of which the position in the shaft direction S is superimposed with that of each resin member 36 to each other. The portion 51 extends over the entire male serration portions 29 in the shaft direction S.

The serrations 25 and the resin members 36 are alternatively placed in the circumferential direction C.

Each resin member 36 includes a pair of flat surfaces 37 and 38 placed relatively internally of a radial direction R of the steering shaft 3 and a cylindrical surface 39 placed relatively externally of the radial direction R.

The pair of flat surfaces 37 and 38 are tapered in cross-sectional shape, and the further down internally of the radial direction R, the shorter the mutual interval between the pair. The pair of flat surfaces 37 and 38 are respectively fixed to the corresponding pair of fixing surfaces 40 and 41. The pair of fixing surfaces 40 and 41 are arranged in a V-lettered shaped groove in cross section, which is formed in each shaft-direction groove 28a of the inner shaft 11. The pair of fixing surfaces 40 and 41 are aligned in the circumferential direction C.

The pair of flat surfaces 37 and 38 and the corresponding fixing surfaces 40 and 41 are fixed, respectively, by using an adhesive agent, for example. In addition, the pair of flat surfaces 37 and 38 and the pair of fixing surfaces 40 and 41 may be fixed by pressing by compressing the resin member 36 into the shaft-direction groove 28a. Each fixing surface 40 and 41 has a predetermined degree of angle G relative to the radial direction R of the inner shaft 11. The degree of angle G is set to an acute angle, e.g., 45 degrees. The degree of angle G refers to an angle formed between the radial direction R passing through the center between the fixing surfaces 40 and 41 in the circumferential direction C and the fixing surface 40 (or 41).

The cylindrical surface 39 is in an arc shape in cross section, which is warped convexly externally of the radial direction R, and the cross section of the cylindrical surface 39 (which is faced to each other with the corresponding shaft-direction groove 26a of the outer shaft 10) has a predetermined curvature radius r1.

Figure 6:
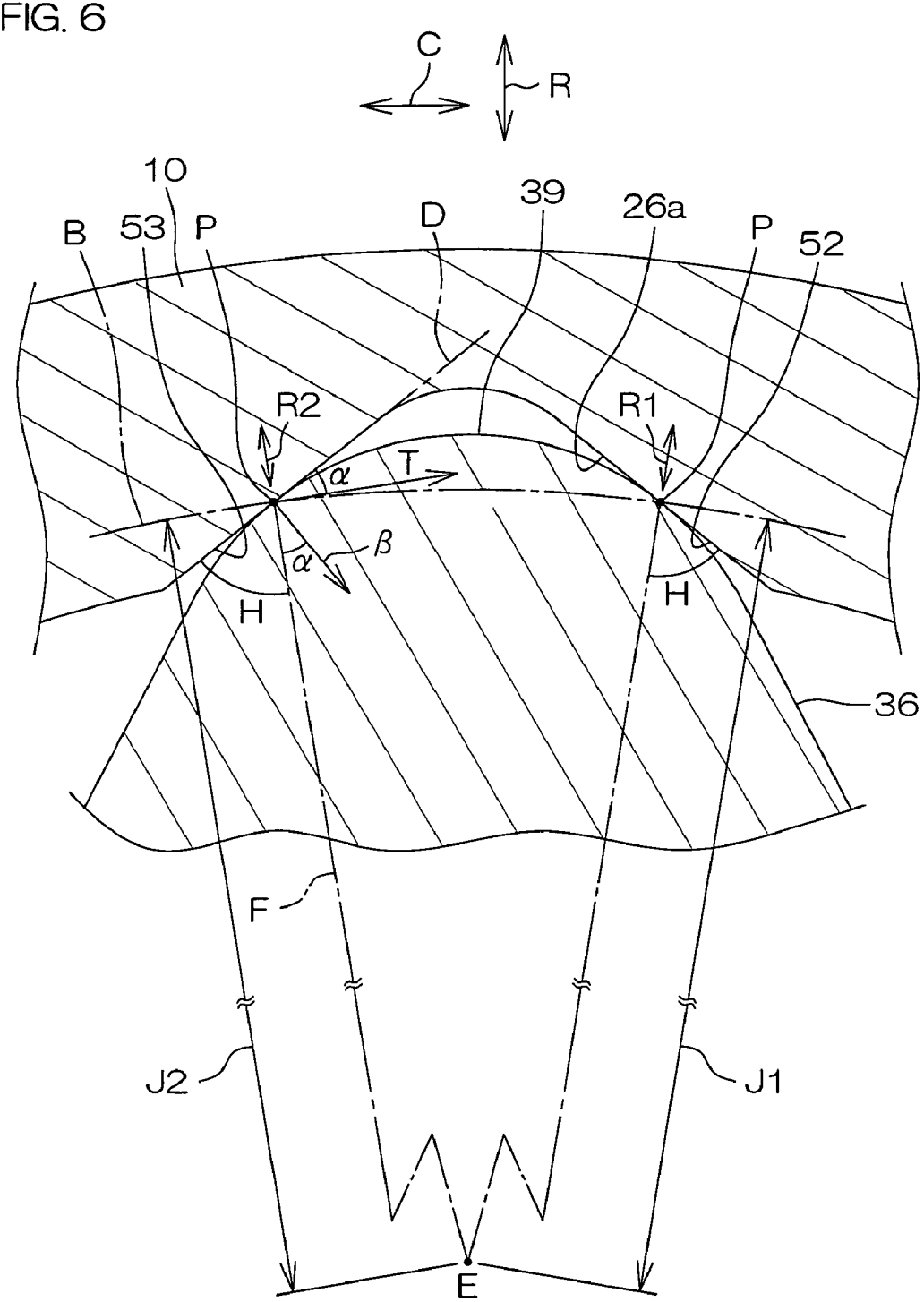
FIG. 6 is a diagram in which one portion in FIG. 5 is enlarged.

FIG. 6 is a diagram in which one portion in FIG. 5 is enlarged. With reference to FIG. 6, the cylindrical surface 39 is faced with a pair of opposite surfaces 52 and 53 formed in the corresponding shaft-direction groove 26a of the outer shaft 10. The pair of opposite surfaces 52 and 53 are aligned in the circumferential direction C, and are formed in a tapered shape in a manner that the further down externally of the radial direction R of the inner shaft 11, the more narrowed the mutual interval between the pair. Each of the opposite surfaces 52 and 53 is a flat surface, and is inclined toward the mutually opposite directions while forming the mutually same degree of angle H in the radial direction R of the inner shaft 11.

The cylindrical surface 39 and each of the corresponding opposite surfaces 52 and 53 linearly contact at contact portions P, respectively. A radial direction R1 crossing the contact portion P of one opposite surface 52 and one opposite surface 52 form the above-described degree of angle H, and a radial direction R2 crossing the contact portion P of the other opposite surface 53 and the other opposite surface 53 form the above-described degree of angle H.

The contact portion P of one opposite surface 52 and the contact portion P of the other opposite surface 53 are aligned on a cylindrical surface B having a predetermined curvature radius where a center axial line E of the outer shaft 10 is the center. In addition, the shaft-direction groove 26a of the outer shaft 10 may be formed in a V-lettered shape in cross section.

As viewed along the shaft direction S, a distance J1 between the contact portion P of one opposite surface 52 and the center axial line E of the inner shaft 11 is made equal to a distance J2 between the contact portion P of the other opposite surface 53 and the center axial line E of the inner shaft 11 (J1=J2).

The cylindrical surface 39 forms a predetermined contact angle α relative to each of the corresponding opposite surfaces 52 and 53 of the shaft-direction groove 26a. The contact angle α refers to an angle formed between a tangent line of the cylindrical surface B in the contact portion P and a tangent line D of the shaft-direction groove 26a in the contact portion P.

In other words, the contact angle α is equivalent to an angle (at each contact portion P) formed between: a line of action β of a force applied from the shaft-direction groove 26a to the resin member 36; and a virtual plane F including the center axial line E of the outer shaft 10 and passing through the contact portion P.

A value of the contact angle α is preferably set to a range of 30 to 60 degrees, and more preferably, set to a range of 40 to 50 degrees. In the present embodiment, the contact angle α is set to 45 degrees, for example.

With reference to FIG. 5 and FIG. 6, in the motor vehicle steering system having the above-described schematic configuration, when the steering angle θ is equal to or less than a predetermined steering angle |θ1|, the inner shaft 11 and the outer shaft 10 can transmit a torque to each other via the resin member 36 only. In other words, by the resin member 36, both shafts 10 and 11 are supported in a floating manner. At this time, the torque T acted between both shafts 10 and 11 acts in the tangential direction of the cylindrical surface B at the contact portion P.

On the other hand, when the steering angle θ exceeds a predetermined steering angle |θ1|, the elastic deformation of the resin member 36 in the circumferential direction C exceeds a predetermined amount. Thereby, the female serration portion 27 of the outer shaft 10 and the male serration portion 29 of the inner shaft 11 are meshed with each other, and as a result, between the female serration portion 27 and the male serration portion 29 of the inner shaft 11, the torque can be transmitted.

According to the present embodiment, the following operation and effect can be provided. That is, even when the steering angle θ is equal to or less than a predetermined steering angle |θ1|, both shafts 10 and 11 are elastically coupled by the resin member 36 in the circumferential direction C. Thereby, when the steering member 2 is steered, a counter force torque (as a counteraction) equal to the input torque according to the steering angle θ can be generated, steering deficiency or steering excess can be prevented, and driver's steering drift can be prevented.

Further, before the steering angle θ exceeds a predetermined steering angle |θ1|, a certain amount of steering counter force has been generated. Thus, it is possible to prevent a steep change in transmission torque before and after the steering angle θ exceeds a predetermined steering angle |θ1|, and the counter force torque (as the counteraction) equal to the input torque can be smoothly raised. Therefore, rather than applying a needless torque fluctuation to the driver, only the information required by the driver, such as a road surface condition and a motor vehicle behavior, can be conveyed. As a result, a steering drift near the steering neutral position where the steering angle θ is zero is eliminated, and a sense of stability of the steering system 1 obtained from the steering member 2 can be improved.

By using the resin member 36, the inner shaft 11 and the outer shaft 10 are mutually floated to avoid the metal contact between the male serration portion 29 and the female serration portion 27 of the serration 25. Thereby, a sliding resistance between both shafts 10 and 11 is significantly lessened. As a result, at the time of the telescopic adjustment, both shafts 10 and 11 can be smoothly slid relative to each other with a small amount of force. Further, forming the resin member 36 in a thin film shape (which is difficult to form) is not necessary, and thus, the yield can be improved and manufacturing at low cost is possible.

Also, the serration 25 is used as the rigid coupling element, reliably coupling the inner shaft 11 and the outer shaft 10 in the circumferential direction C.

Further, a plurality of resin members 36 are placed and spaced apart at equal intervals in the circumferential direction C, and thereby, the load acted in each resin member 36 can be uniformly dispersed, permitting reliable holding of both shafts 10 and 11 on the same axial line.

Further, the cylindrical surface 39 of the resin member 36 is linearly contacted to the shaft-direction groove 26a of the outer shaft 10 by a predetermined contact angle a. Thus, a sliding friction between the resin member 36 and the shaft-direction groove 26a can be minimized as small as possible, and also, a mutual contact length between the resin member 36 and the outer shaft 10 in the shaft direction S can be sufficiently secured, and thus, the outer shaft 10 can be firmly supported.

Further, to the pair of fixing surfaces 40 and 41 of the shaft-direction groove 28a of the inner shaft 11, the corresponding flat surfaces 37 and 38 of the resin member 36 are fixed, respectively. Thus, the resin member 36 can be reliably held by the inner shaft 11, and pulling off of the resin member 36 from the shaft-direction groove 28a can be prevented.

The present invention is not limited to the content of the above-described embodiment. For example, instead of the serration 25, a spline may be arranged. In this case, a female spline portion of the spline is formed on the inner circumferential surface 26 of the outer shaft 10, and a male spline portion is formed on the outer circumferential surface 28 of the inner shaft 11.

Further, the placement of the cylindrical surface 39 of the resin member 36 and that of the pair of flat surfaces 37 and 38 may be replaced. In this case, the pair of flat surfaces 37 and 38 of the resin member 36 are placed relatively externally in the radial direction R, and fixed to the shaft-direction groove 26a of the outer shaft 10. Also, the cylindrical surface 39 is placed relatively internally in the radial direction R, and the cylindrical surface 39 is linearly contacted to the shaft-direction groove 28a of the inner shaft 11 by a predetermined contact angle a.

Further, the present invention may be applied to an intermediate shaft.

The present invention may also be applied to an electric power steering apparatus for imparting a steering assist force to a steering shaft by an electric motor, or to a power steering apparatus such as a hydraulic power steering apparatus for imparting a steering assist force to a rack shaft by a hydraulic cylinder.

When the present invention is applied to the power steering apparatus, the steering angle at which imparting of the steering assist force is started is set to be equivalent to the predetermined steering angle |θ1|. That is, regions in which the steering angle θ is equal to or less than the predetermined steering angle |θ1| is a region in which the steering assist force is not generated irrespective of steering of the steering member. At the time of a steering angle (the above-described region) minute to an extent that the steering assist force is not imparted, the torque transmission between the inner shaft 11 and the outer shaft 10 is performed via the resin member 36 only.

EXAMPLE

Experimental Example

The steering shaft shown in FIG. 5 was used as an experimental example.

Comparative Example

Figure 7:
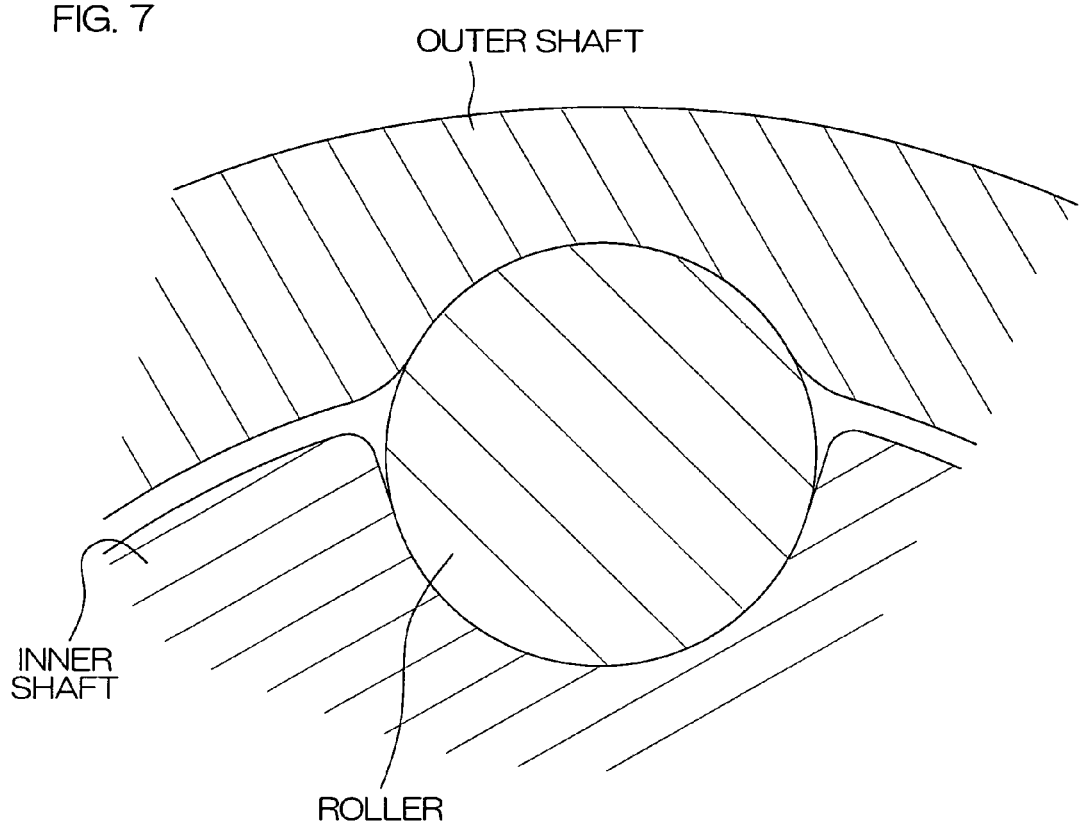
FIG. 7 is a cross-sectional view of a main part of a comparative example.

The steering shaft shown in FIG. 7 was used as a comparative example. The comparative example differs from the experimental example in that: instead of the resin member, a roller extending in the shaft direction was used; and cross-sectional shapes of the shaft-direction groove of the outer shaft and the shaft-direction groove of the inner shaft were both formed in an arc shape along the shape of the outer circumferential surface of the roller and the roller was interposed in a manner to enable relative sliding between each of the shaft-direction grooves.

With respect to the steering shaft of the experimental example and that of the comparative example, the inner shaft and the outer shaft were relatively rotated within a predetermined twisted angle. In this condition, a relationship between a twisted angle and a torque acted on a steering angle was examined. The results are shown in FIG. 8.

Figure 8:
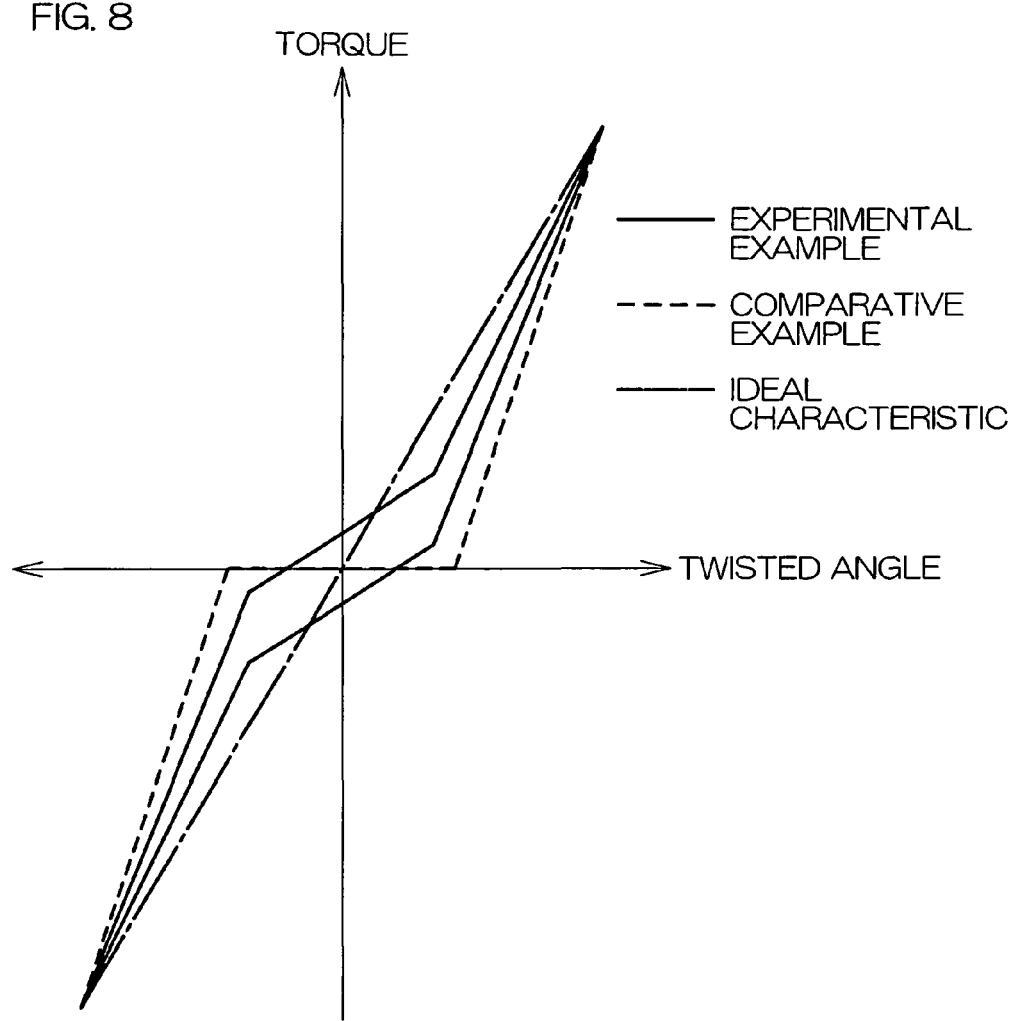
FIG. 8 is a graph showing relationships between a steering angle and a torque in each of an experimental example and a comparative example.

As shown in FIG. 8, in the experimental example, the torque fluctuates approximately linearly according to the twisted angle while in the comparative example, the torque remains substantially zero until up to a certain twisted angle, and at the certain twisted angle, the torque suddenly rises.

Thus, it was demonstrated that in the experimental example, near the steering neutral position (where the steering angle (twisted angle) is zero), no steering drift occurs, and a sense of stability (characteristic) obtained from the steering member could be brought close to an ideal characteristic.

Thus, the present invention is described in detail by specific modes. Those skilled in the art who understand the above-described contents may easily conceive the modifications, alternations, and equivalents. It should be therefore appreciated that the present invention covers the scope of claims and the scope of equivalents.

This application corresponds to Japanese Published Unexamined Patent Application No. 2006-305529 filed with the Japanese Patent Office on Nov. 10, 2006, the full disclosure of which is incorporated herein by reference.

The invention claimed is:

1. A motor vehicle steering shaft that rotates responsively to steering of a steering member, the motor vehicle steering shaft comprising:
    an inner shaft and a tubular outer shaft fitted in a manner to relatively slide in a shaft direction and to transmit a torque to and from each other;
    a rigid coupling element for rigidly coupling the inner shaft and the outer shaft in a circumferential direction of the inner shaft when a relative rotation amount of the inner shaft and the outer shaft exceeds a predetermined range; and
    an elastic coupling element for elastically coupling the inner shaft and the outer shaft in the circumferential direction of the inner shaft when the relative rotation amount of the inner shaft and the outer shaft is within the predetermined range;
    the elastic coupling element including a resin member that extends across a first shaft-direction groove formed on an outer circumferential surface of the inner shaft and a second shaft-direction groove formed on an inner circumferential surface of the outer shaft;
    the inner shaft and the outer shaft being elastically supported mutually via the resin member at a central position of the predetermined range when no torque is loaded to the steering shaft;
    the resin member including a cylindrical surface that has a contact portion linearly contacting the second shaft-direction groove;
    the second shaft-direction groove and the contact portion forming a predetermined contact angle;
    the second shaft-direction groove including a pair of opposite surfaces facing the circumferential direction of the inner shaft and the cylindrical surface of the resin member;
    contact portions linearly contacting the cylindrical surface being formed on each of the pair of the opposite surfaces;
    a distance between one contact portion of the pair of the opposite surfaces and a center of the inner shaft being equal to a distance between the other contact portion of the pair of the opposite surfaces and the center of the inner shaft;
    the first shaft-direction groove including a pair of fixing surfaces aligned in the circumferential direction of the inner shaft; and
    the resin member including a pair of flat surfaces fixed on the pair of fixing surfaces.

2. The motor vehicle steering shaft according to claim 1, wherein
    the rigid coupling element comprises a plurality of rigid coupling elements that are placed at equal intervals in the circumferential direction of the inner shaft,
    the resin member comprises a plurality of resin members that are placed at equal intervals in the circumferential direction of the inner shaft, and
    the rigid coupling elements and the resin members are alternatively placed in the circumferential direction of the inner shaft.

3. The motor vehicle steering shaft according to claim 2, wherein
    each of the rigid coupling elements includes a plurality of outer teeth and a plurality of inner teeth that can be meshed with one another, and the outer teeth are formed on the outer circumferential surface of the inner shaft, and the inner teeth are formed on the inner circumferential surface of the outer shaft.

4. The motor vehicle steering shaft according to claim 3, wherein the outer teeth and the inner teeth can be spline-connected or serration-connected.

5. The motor vehicle steering shaft according to claim 3, wherein
the inner teeth and the outer teeth are kept apart so as not to be meshed with one another when the relative rotation amount of the inner shaft and the outer shaft is within the predetermined range.

6. The motor vehicle steering shaft according to claim 3, wherein the inner teeth and the outer teeth are meshed with one another to thereby rigidly couple the inner shaft and the outer shaft in the circumferential direction of the inner shaft when the relative rotation amount of the inner shaft and the outer shaft exceeds the predetermined range.

7. The motor vehicle steering shaft according to claim 1, wherein each of the pair of the opposite surfaces is inclined in opposite directions in a manner to form equal degrees of angles to a radial direction of the inner shaft.

8. The motor vehicle steering shaft according to claim 1, wherein the rigid coupling element and the resin member include a portion in which positions in the shaft direction of the inner shaft are superimposed with each other.

9. A motor vehicle steering system, wherein a motor vehicle steering shaft according to claim 1 is used to transmit a steering torque of a steering member to a steered mechanism.

* * * * *